April 6, 1937. J. J. MacKAY 2,075,858

METHOD FOR MAKING GASKET STRIPS

Filed March 30, 1934

INVENTOR
JOHN JAMES MacKAY
By Adam E. Fisher
ATTORNEY

Patented Apr. 6, 1937

2,075,858

UNITED STATES PATENT OFFICE 2,075,858

METHOD FOR MAKING GASKET STRIPS

John James MacKay, Willowdale, Nova Scotia, Canada

Application March 30, 1934, Serial No. 718,224

2 Claims. (Cl. 91—68)

This invention relates to a method for making treated gaskets and gasket strips, as well as the product itself of such method.

The object of the invention is to provide in a cheap and practical form, a pliable, treated gasket strip from which gaskets of various kinds and shapes may be cut and formed as required for various uses, thus avoiding the expense of stocking the many different forms required.

Another object is to provide a pliable and treated gasket strip of the kind referred to, the same being saturated or impregnated with a viscous composition or mixture calculated to resist evaporation as well as the encroachment of oil, and from which strip various sizes and shapes of gaskets may be cut and formed as desired for any purpose.

Another object is to provide a method of making the said treated gasket strips referred to.

And still another object is to provide a special form of tool to facilitate the cutting of the central holes of the gaskets as made from the gasket strips referred to.

With the foregoing and such other objects and advantages in view as may appear from the following specification, attention is directed to the accompanying drawing as exemplifying sample gasket strips and gaskets as made in accordance with this invention, and illustrating also the special tool adapted for the cutting or forming of the central holes of the gaskets.

Figure 1:
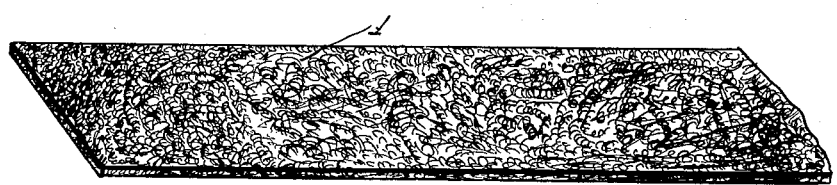
Figure 1 represents a straight strip of felt material or the like, such as is used in the making of gasket strips in accordance with this invention.

In practicing this invention, I take a strip of felt material, a section of which is represented at 1 in Figure 1, the same being of suitable width and thickness and of any convenient length, and first pass the same through an open flame for burning off the loose hair without damaging the fabric itself.

I next make a saturated solution of gum arabic by letting a quantity of the gum dissolve in water for a few days, or until it forms a thick syrup. In another vessel, I make a starch solution similar to that used in laundry work and of such consistency that it will flow when cold. I then take one part by measure, each of the gum arabic solution and the starch solution, and add by measure two parts of water and one part of glycerin and mix all together thoroughly in one vessel. I then put the felt strip or strips in this solution and stir until the strip material is thoroughly saturated. I then take the strips out and run same through a wringer and hang the strips up to dry.

The function of the starch is to serve as a filler only, and is used because of its cheapness.

The function of the gum arabic is to toughen the felt fabric and cause the fibers thereof to cohere closely. It also excludes oil.

The function of the glycerin is to exclude oil, with which it will not mix, and to maintain the fabric in a suitably soft and pliable condition for use, inasmuch as it is very resistant to the process of evaporation.

Figure 2:
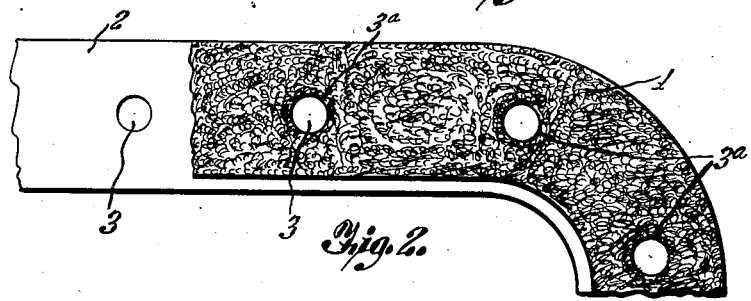
Figure 2 represents a curved gasket strip as cemented upon a curved section of iron frame having bolt holes therethrough, there being registering holes formed through the strip, the gasket being curved to the required shape by stretching the pliable and treated fabric.
Figure 5:
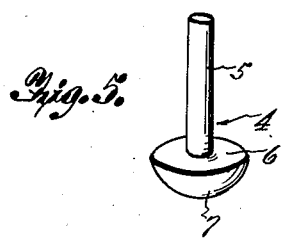
Figure 5 is a perspective view of the special tool designed for use in cutting the holes through the gasket strips which comprise part of the subject matter of this invention.
Figure 6:
Figure 6 is a plan view of the under side of the bit of the tool.

In forming and applying gaskets to any location, as upon the frame piece represented at 2 in Figure 2, wherein are shown a number of bolt holes 3, I take a piece 1 of the strip felt prepared as aforesaid and cement the strip over the holes by the use of any conventional form or make of quick drying cement. Holes 3a may then be cut through the strip 1 in exact registry with the holes 3 of the frame or other work bearing the said bolt holes. In the cutting of the holes 3a, I find a special tool represented at 4 in Figure 5 as very convenient and effective. This tool consists of a shank 5 for fitting into a brace or drill (not shown), and a bit 6 integrally formed at the end of the shank. The bit 6 is ovoid, or rounded and lengthened at its under or working face, as shown at 7. This bit being rapidly rotated upon the strip immediately over the holes 3 of the frame, very quickly and neatly cuts away the fabric and provides a clean-cut opening through the gasket strip for the passage of the bolts (not shown).

Figure 3:
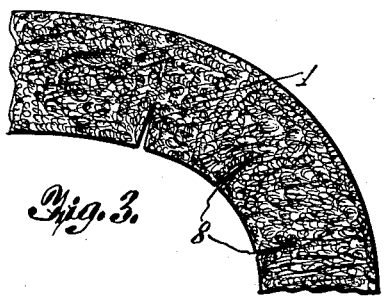
Figure 3 represents a gasket strip formed arcuately by cutting out V-shaped gores and then bringing the edges back together.
Figure 4:
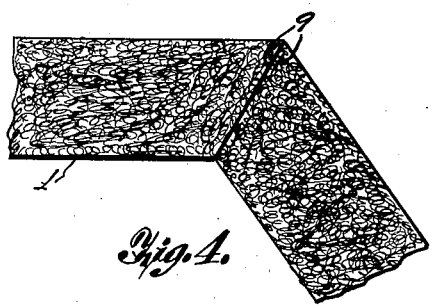
Figure 4 represents a gasket strip formed angularly by mitering the meeting ends of two strip pieces and joining those ends.

Gasket strips prepared as described may be very readily stretched along one margin and so shaped or curved as desired, or triangular gores may be cut out along one margin and the edges of the resulting notches again brought together as indicated at 8, in Figure 3. Angular gaskets may be formed by mitering the ends of two strips as indicated at 9 in Figure 4, and then joining those ends.

I claim:

1. The method of oil-proofing a fabric gasket, the same comprising the saturation of the fabric with a fluent mixture of the solutions of gum arabic, starch and glycerin in equal proportions.

2. The method of oil-proofing a fabric gasket, the same comprising the saturation of the fabric with a fluent mixture of the solutions of gum arabic, starch, glycerin and water mixed in the proportion of one part each of the said gum arabic, starch and glycerin to two parts of the water and then evaporating off the water.

JOHN JAMES MacKAY.